(12) United States Patent
Hirata

(10) Patent No.: US 7,089,488 B2
(45) Date of Patent: Aug. 8, 2006

(54) ELECTRIC FORM HANDLING SYSTEM, ELECTRIC FORM HANDLING PROGRAM, COMPUTER-READABLE RECORDING MEDIUM RECORDING THE SAME AND ELECTRIC FORM HANDLING METHOD

(75) Inventor: Kenji Hirata, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 640 days.

(21) Appl. No.: 10/320,106

(22) Filed: Dec. 16, 2002

(65) Prior Publication Data

US 2003/0145276 A1 Jul. 31, 2003

(30) Foreign Application Priority Data

Dec. 20, 2001 (JP) ............................. 2001-388571
Jun. 10, 2002 (JP) ............................. 2002-169097

(51) Int. Cl.
*G06F 17/00* (2006.01)
(52) U.S. Cl. ..................... 715/506; 715/505; 715/507
(58) Field of Classification Search ................ 715/500, 715/505, 506, 507, 511, 522
See application file for complete search history.

(56) References Cited

U.S. PATENT DOCUMENTS

| | | | | |
|---|---|---|---|---|
| 6,161,113 A * | 12/2000 | Mora et al. | ................. | 715/505 |
| 6,449,627 B1 * | 9/2002 | Baer et al. | ................. | 715/514 |
| 6,611,840 B1 * | 8/2003 | Baer et al. | ................. | 707/102 |
| 6,714,915 B1 * | 3/2004 | Barnard et al. | ................. | 705/7 |
| 2002/0019836 A1 * | 2/2002 | Uchio et al. | ................. | 707/511 |
| 2002/0077939 A1 * | 6/2002 | Nicastro et al. | ................. | 705/29 |
| 2002/0184121 A1 * | 12/2002 | Sijacic et al. | ................. | 705/30 |
| 2002/0184123 A1 * | 12/2002 | Sijacic et al. | ................. | 705/34 |

FOREIGN PATENT DOCUMENTS

| | | |
|---|---|---|
| JP | 3-106141 | 5/1991 |
| JP | 8-180114 | 12/1996 |
| JP | 9-224050 | 8/1997 |
| JP | 10-312418 | 11/1998 |
| JP | 2000-090181 | 3/2000 |
| JP | 2000-222305 | 8/2000 |
| JP | 2000-222500 | 11/2000 |
| JP | 2000-311204 | 11/2000 |
| JP | 2001-034687 | 2/2001 |
| JP | 2001-052044 | 2/2001 |
| JP | 2001-229315 | 8/2001 |
| JP | 2001-125997 | 11/2001 |

OTHER PUBLICATIONS

Satoshi Ishizawa, "Complete Mastering of Work Flow for Improving Job Efficiency," Softbank Corp., Lotus Magazine, pp. 51-56, vol. 20, Jun. 13, 1998 and a partial translation thereof.

* cited by examiner

*Primary Examiner*—Stephen Hong
*Assistant Examiner*—Gregory J. Vaughn
(74) *Attorney, Agent, or Firm*—Brooks Kushman P.C.

(57) ABSTRACT

The invention provides a technique for allowing a user lacking of high level technical knowledge on a program of an approval route to easily create an electric form template. For creating an electric form template having an application part where an application item to be approved is input and an address part where one or more approval officers to approve the application item are specified, a plurality of approval routes each having an approval function to obtain approval of an approval officer for an electric form are prepared, so that an address part and a necessary approval function can be incorporated into a template by selecting an approval pattern.

12 Claims, 17 Drawing Sheets

FIG. 4

| Name of form | Application for data use |
| Business process | Pattern 3 |
| Name of copied document | |

Creation

Application for data use-Address edit

※ Must: Set must nodes. Option: Set skippable nodes.

| Kiansha (Draftsman) | Shinsasha 1 (Examination Officer) ○ Must ● Option | Shinsasha 2 (Examination Officer) ○ Must ● Option | Shinsasha 3 (Examination Officer) ○ Must ● Option | Shoninsha (Approval Officer) ● Must ○ Option |
| --- | --- | --- | --- | --- |
| Tantousha (Person In Charge) ● Must ○ Option | Shinsasha 1 (Examination Officer) ○ Must ● Option | Shinsasha 2 (Examination Officer) ○ Must ● Option | Shinsasha 3 (Approval Officer) ○ Must ● Option | Shoninsha (Approval Officer) ● Must ○ Option |
| Tantousha (Person In Charge) ● Must ○ Option | Shinsasha 1 (Examination Officer) ○ Must ● Option | Shinsasha 2 (Examination Officer) ○ Must ● Option | Shinsasha 3 (Examination Officer) ○ Must ● Option | Shoninsha (Approval Officer) ● Must ○ Option |

Save address setting | Close

FIG. 17

Actual use transition complete confirm

| Form Name | Application for data use |
| Applying Dept | |
| Applicant | |
| E-mail(E-mail Address) | |

Subject

ELECTRIC FORM HANDLING SYSTEM, ELECTRIC FORM HANDLING PROGRAM, COMPUTER-READABLE RECORDING MEDIUM RECORDING THE SAME AND ELECTRIC FORM HANDLING METHOD

BACKGROUND OF THE INVENTION

The present invention relates to an electric form handling system, an electric form handling program, a computer-readable recording medium in which the program is recorded and an electric form handling method.

A system in which an electrically written form is circulated for, for example, asking for approval of circulated persons via a computer network, namely, what is called a work flow system, is conventionally known as disclosed in Japanese Laid-Open Patent Publication No. 2001-125997.

A system for circulating electric forms through the work flow is now being rapidly introduced into a variety of enterprises in order to improve the efficiency and realize a paperless system in form handling work conventionally practiced through circulation and the like of form papers. An electric form is, for example, in the case of applying for a business trip, an application that is completed by a draftsman by invoking an electric form template for a business trip, that is, a template of an electric form related to a business trip, and inputting predetermined items in the electric form template.

Also, the work flow is a system, used in an enterprise or the like, realized on a network for circulating forms and papers for approval for handling various works and making various decisions.

An enterprise has a plurality of departments such as an intellectual property department and a sales department. Necessary form formats are different among these departments. A form format is the constitution of items of an electric form template. For example, in the intellectual property department, items such as "Patent" and "Request for examination" are necessary, which are probably not necessary in the sales department. On the other hand, in the sales department, items such as "Business expenses" and "Number of persons involved in business matter" are necessary, which are probably not necessary in the intellectual property department. Also, each department has its own work system, and therefore, the program of a necessary approval route is different among the departments. The program of an approval route is a program for realizing a system for circulating an electric form for approval on a network. An approval route is a circulating route of an electric form. Accordingly, a general work flow system cannot be directly applied, and each department should independently create a form format and a program of an approval route. Furthermore, since the work system of each department covers a variety of divergences, each department should prepare a large number of electric form templates. An electric form template includes a form format and an approval route.

However, since high level IT knowledge is necessary for developing a program of an approval route, it is very difficult to develop a form format and a program of an approval route from the beginning in a department other than, for example, an information system department that is an expert in the IT.

Alternatively, an order may be placed with an IT-related firm or the like outside for creating a form format and a program of an approval route. However, the IT-related firm or the like does not sufficiently grasp the business contents of the orderer enterprise that are indispensable for the creation, and hence should first make efforts to grasp the business contents. As a result, the development takes the IT-related firm or the like a long time.

In this manner, although the information system department or an IT-related firm has high level technical knowledge necessary for creating electric form templates, it is ignorant of information on the business system of each department and hence has a difficulty in creating electric form templates according to the business system of each department. Also, a large amount of work is necessary for creating electric form templates of all the departments, and it is difficult to leave all the work to the information system department or the IT-related firm.

Alternatively, in the case where each department creates electric form templates to be used by itself, although the department has a large stock of knowledge on its business system, it does not have the knowledge necessary for creating an approval route and hence has a difficulty in creating electric form templates according to its business system.

SUMMARY OF THE INVENTION

In consideration of the aforementioned problems, the present inventors have found the following: At the stage of creating an electric form template, the information on the business system of each department is necessary for creating a form format, which can be created by a person with no technical knowledge of the IT. On the other hand, the high level technical knowledge of the IT is necessary for creating a program of an approval route. However, differently from a form format that can be created in any of a large number of variations, the number of patterns of the approval route is limited.

Therefore, the present inventors have come to a conclusion that the following is proper: When an electric form template used in each department is created by a draftsman belonging to the department, the draftsman is allowed to freely specify a form format, and creation of a program of an approval route is supported by any means for reducing the burden of the draftsman.

The present invention was devised in consideration of the above, and an object is, in the case where a user creates an electric form template, providing technique with which an electric form template can be easily created even by a user lacking of high level knowledge of a program of an approval route.

Specifically, the electric form handling system of this invention in which an applicant is allowed to write an electric form having an application part where an application item to be approved is input and an address part where one or more approval officers to approve the application item are specified, and in which application filing of the electric form by the applicant and approval for the electric form by the approval officers specified by the applicant are practiced via a computer network, includes template creation supporting means for allowing a draftsman to create a form template, which is invoked by the applicant to be used in writing the electric form, and storing the created form template by request, and the template creation supporting means includes application part creation supporting means for allowing the draftsman to create the application part by request; and address part creation supporting means for allowing the draftsman to create the address part by request, and the address part creation supporting means is provided with a plurality of approval patterns each having an approval function to obtain approval of the approval officers for the electric form, and when an approval pattern is selected by the draftsman from the plurality of approval patterns, an address part and an approval function corresponding to the selected approval pattern are incorporated into the form template.

Accordingly, a variety of electric form templates different in the format of the application part (namely, the form format) and the approval pattern among respective departments can be easily created by a department using the templates without individual support by a system engineer. Specifically, when a template draftsman of each department selects an approval pattern suitable to an electric form to be written, the address part (approval route) where an approval officer is specified and the approval function to obtain approval of the approval officer (i.e., a program for obtaining approval according to the approval route) are automatically set. Therefore, the draftsman can create the template merely by editing the application part substantially on the basis of his/her own knowledge on the work system, and does not need any high level technical knowledge on the IT for creating the template.

Preferably, the address part creation supporting means is provided with the plurality of approval patterns in accordance with the number of departments in which approval is to be obtained by using the electric form.

Specifically, in the case where the application item needs to be approved in one department alone, the electric form is circulated for obtaining approval of one, two or more approval officers of that department so that the applicant can be informed of the result. In the case where the application item needs to be approved in two or more departments, the electric form is circulated, for example, in one department and successively in another department so that the applicant can be informed of the result. In this manner, the pattern of the approval route depends, to some extent, upon the number of departments in which approval is to be obtained. Therefore, a plurality of approval patterns different in the approval route are prepared in this invention in accordance with the number of departments in which approval is to be obtained. As a result, there is no need to prepare a plurality of programs regarding the respective approval routes.

Preferably, the plurality of approval patterns of the address part creation supporting means include a serial approval pattern in which approval for an electric form is requested successively one by one of a plurality of approval officers and a parallel approval pattern in which approval for an electric form is requested simultaneously in parallel of a plurality of approval officers.

When the application item needs to be approved by a plurality of approval officers, it should be approved in a predetermined order of the plural approval officers in some cases and it may be approved in any order in other cases. This is not limited to the case where the application item should be approved by a plurality of approval officers in one department. Also in the case where the application item needs to be approved in a plurality of departments, it should be approved in a predetermined order of the plural departments in some cases and it may be approved in any order in other cases. Therefore, both the serial approval pattern and the parallel approval pattern are prepared.

Preferably, an address part of the form template includes an ultimate approval officer field in which an ultimate approval officer to ultimately approve the electric form is specified and one or more of advance approval officer fields in each of which an advance approval officer to approve the electric form before the ultimate approval officer is specified, and the approval function is set in such a manner that when no advance approval officer is specified in any of the one or more advance approval officer fields, approval for the electric form is requested of an approval officer in a subsequently specified approval officer field.

If approval patterns are prepared in accordance with the number of approval officers, the number of patterns becomes large, and hence, it is necessary to prepare a large number of programs for the approval routes. However, according to the invention, the increase in the number of approval patterns can be avoided by providing an excessive number of, for example, the advance approval officer fields.

Preferably, the address part includes a plurality of approval officer fields in each of which an approval officer is specified, and the address part creation supporting means inhibits from specifying a particular approval officer in each approval officer field of the form template.

Since the template is used for writing an electric form, if a particular approval officer is previously specified, it is necessary to change the template itself when the approval officer should be changed due to personnel changes or the like. Therefore, according to this invention, the approval officer field alone is provided at the stage of creating a template without specifying an approval officer, so that an approval officer can be specified at the stage of writing an electric form by using the template. Accordingly, even when the approval officer should be changed, there is no need to change the template itself, and hence, there is no need to confirm the operation of a changed template.

Furthermore, in the case where there are a plurality of work systems different in the approval officers alone, the draftsman can write electric forms by using the same template. Thus, there is no need to prepare electric form templates with respect to the respective work systems, which reduces the burden.

Preferably, the application part creation supporting means and the address part creation supporting means allow the form template to be constructed as a table having a plurality of rows, and each of the plurality of rows of the table is defined as a form item field of the application part or an approval officer field of the address part.

Since the template is thus constructed as the table, definition of the template can be made without any system operating ability, and the template can be created without paying attention to the layout of the form item and the like.

Preferably, the application part creation supporting means is provided with two or more form item members each defined in a format applicable to each row of the application part, and the application part is completed by setting any of the form item members.

Accordingly, a desired template can be easily created without special knowledge merely by incorporating any of previously prepared members (form item members) into each row of the application part.

Preferably, the application part creation supporting means constructs the application part as a table having a plurality of rows and a plurality of columns, and some of the plurality of rows or the plurality of columns are able to be combined to define one form item field.

Accordingly, the form item field in an appropriate size in accordance with the form item can be easily created without special knowledge.

Preferably, the application part creation supporting means supports creation of the application part after the selection of the approval pattern.

Accordingly, even in the case where the design of the application part is varied depending upon the approval pattern (for example, in the case where the space of the application part on the template is limited because the number of approval officers is large), the application pattern can be designed in accordance with the selected approval pattern. Also, the draftsman is made to select the approval route, which is significant, priorly to the creation of the application part, and therefore, the draftsman minimally makes a mistake in selecting the approval route.

Alternatively, the electric form handling program of this invention, used in an electric form handling system in which an applicant is allowed to write an electric form having an application part where an application item to be approved is input and an address part where one or more approval officers to approve the application item are specified and in which application filing of the electric form by the applicant and approval for the electric form by the approval officers specified by the applicant are practiced via a computer network, for template creation support for allowing a draftsman to create a form template to be invoked by the applicant for use in writing the electric form and storing the created form template by request, and the electric form handling program allows a computer to execute to accept a form template creation request from the draftsman and request the draftsman to select a necessary approval pattern from a plurality of approval patterns; to support creation of the address part by incorporating, into the form template, an address part corresponding to the selected approval pattern and an approval function corresponding to the selected approval pattern to obtain approval of the approval officers for the electric form; and to support creation of the application part.

Alternatively, the computer-readable recording medium of this invention recording an electric form handling program, used in an electric form handling system in which an applicant is allowed to write an electric form having an application part where an application item to be approved is input and an address part where one or more approval officers to approve the application item are specified and in which application filing of the electric form by the applicant and approval for the electric form by the approval officers specified by the applicant are practiced via a computer network, for template creation support for allowing a draftsman to create a form template to be invoked by the applicant for use in writing the electric form and storing the created form template by request, the electric form handling program allows a computer to execute to accept a form template creation request from the draftsman and request the draftsman to select a necessary approval pattern from a plurality of approval patterns; to support creation of the address part by incorporating, into the form template, an address part corresponding to the selected approval pattern and an approval function corresponding to the selected approval pattern to obtain approval of the approval officers for the electric form; and to support creation of the application part.

According to the electric form handling program, the above-described electric form handling system can be realized, so that a variety of electric form templates different in the format of the application part and the approval pattern among respective departments can be easily created by a department using the templates without special knowledge.

Alternatively, the electric form handling method of this invention, used in an electric form handling system in which an applicant is allowed to write an electric form having an application part where an application item to be approved is input and an address part where one or more approval officers to approve the application item are specified and in which application filing of the electric form by the applicant and approval for the electric form by the approval officers specified by the applicant are practiced via a computer network, for creating, by using a computer, a form template to be invoked by the applicant for use in writing the electric form, the computer stores a plurality of approval patterns each having an approval function to obtain approval of the approval officers for an electric form, and when a necessary approval pattern is selected, for creating the form template, from the plurality of approval patterns stored in the computer, an address part and an approval function corresponding to the selected approval pattern are incorporated into the form template.

Accordingly, when a template draftsman selects a necessary approval pattern from the plural approval patterns previously stored in the computer, the address part and the necessary approval function can be incorporated into the template without special knowledge. Thus, a template can be created advantageously easily by the department using the template.

As described so far, according to the invention, for creating an electric form template having an application part where an application item to be approved is input and an address part where an approval officer to approve the application item is specified, a plurality of approval patterns each having an approval function to obtain approval of the approval officer for an electric form are prepared, so that the address part and the necessary approval function can be incorporated into the template by selecting the approval pattern. Accordingly, a variety of electric form templates different in the format of the application part and the approval pattern among respective departments can be easily created without special knowledge on the IT.

BRIEF DESCRIPTION OF THE DRAWINGS

FIG. 4 is a diagram of a setting window according to the embodiment;

FIG. 9 is a diagram of a form image viewing window according to the embodiment;

FIG. 13 is a diagram of an address editing window according to the embodiment;

FIG. 17 is a diagram of an actual use transition complete confirming window according to the embodiment.

DETAILED DESCRIPTION OF THE INVENTION

A work flow system for executing electric form work flow processing will be first described.

Figure 1:
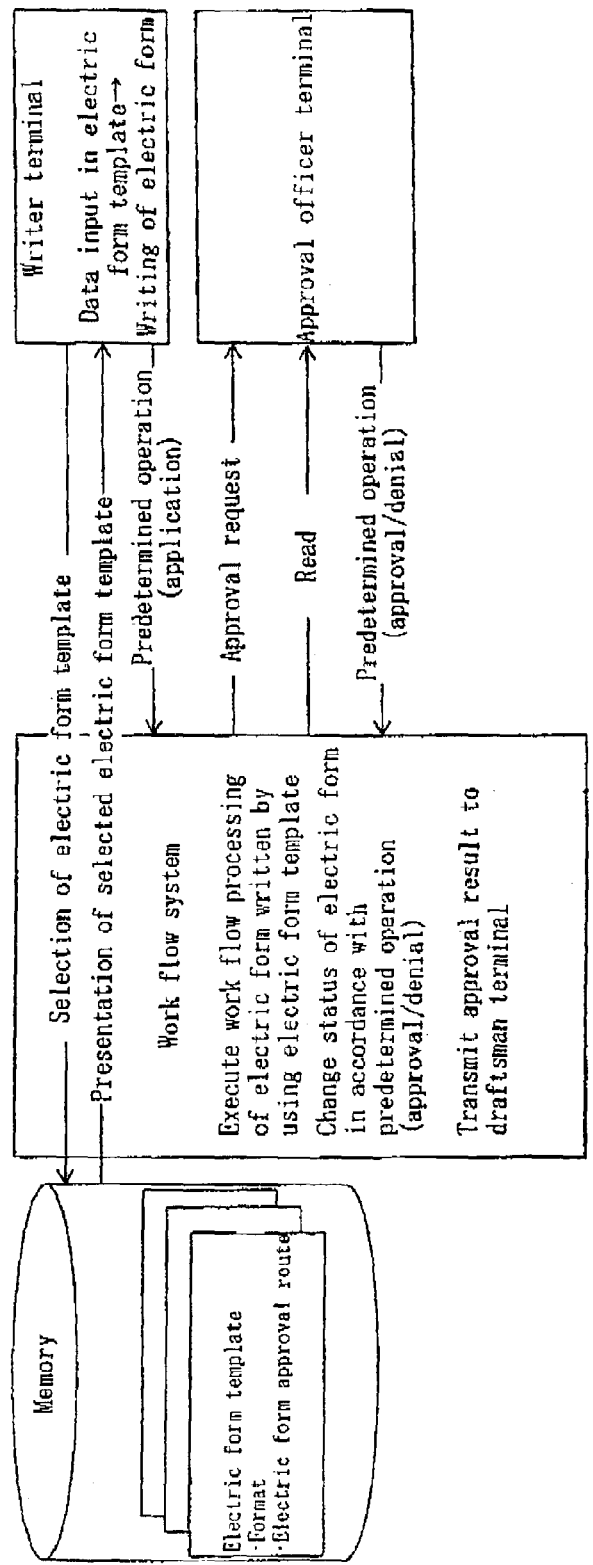
FIG. 1 is a schematic diagram for showing the architecture of a work flow system for executing electric form work flow processing.
Figure 2:
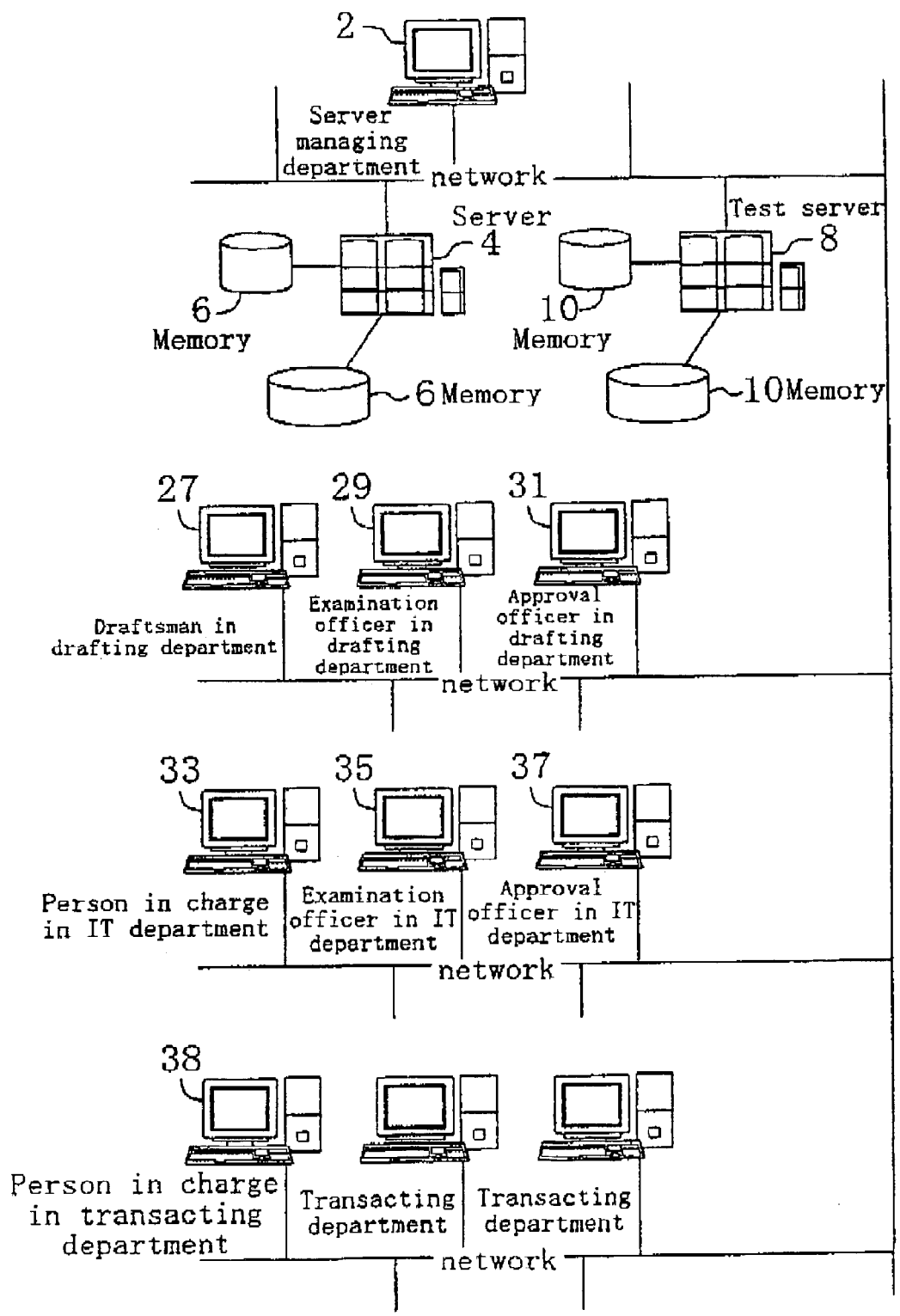
FIG. 2 is a schematic diagram for showing the architecture of a system according to an embodiment of the invention.

FIGS. 1 and 2 are respective schematic diagrams for showing the architecture of the work flow system for executing the electric form work flow processing.

The work flow system is registered in a server 4, and the server 4 is connected via a network to a memory 6, an applicant terminal used by an applicant and an approval officer terminal used by an approval officer. Herein, the server 4 corresponds to a department executing the electric form work flow processing, and the memory 6 corresponds to a department storing electric form templates. An electric form template is a template of an electric form and includes a form format and an approval route of the electric form. A form format corresponds to items of an electric form template. An applicant is a person that writes an electric form by using an electric form template stored in the memory 6. An approval officer is a person that decides whether or not an electric form is approved.

Procedures in the electric form work flow processing are as follows:

First, an applicant selects one electric form template suitable to a desired work system from electric form templates presented by the server 4. Next, the applicant inputs predetermined data in the selected electric form template so as to write an electric form. After completing the electric form, the applicant applies for approval of the electric form through a predetermined operation, so that the server 4 can operate the electric form on the work flow.

Next, the server 4 submits an e-mail for requesting approval for the electric form to an approval officer terminal of an approval officer specified by the applicant. The approval officer having received the e-mail reads the electric form so as to decide whether or not it is approved. The approval result of the approval officer is submitted to the server 4, and the server 4 changes the status of the electric form in accordance with the approval result. Herein, the status means information on the electric form, for example, that it has been examined by the approval officer or is waiting for approval of the approval officer. Thereafter, the server 4 submits the approval result to the applicant terminal via e-mail.

In this embodiment, the system includes, as shown in FIG. 2, a terminal 2 of a server managing department for managing a server 4, the server 4, a memory 6 included in the server for storing a plurality of business processes (hereinafter sometimes referred to as the BPs) and a form editing window described below, a test server 8 and a memory 10 included in the test server 8, all of which are connected via a network to terminals 27, 29 and 31 of a drafting department, terminals 33, 35 and 37 of an IT department for managing the whole system in the enterprise, a terminal 38 of a transacting department or the like described below. Each terminal is constructed from a computer. However, the architecture and the like of the system is arbitrary. Furthermore, the server 4, the test server 8, the memory 6 of the server 4 and the memory 10 of the test server together construct a host computer.

In this embodiment, a program, which allows the host computer to function to support the creation of an electric form template, the creation of an electric form and the approval of an electric form, allows the host computer to function as terminal functioning means, template creation supporting means, template storing means, electric form creation supporting means, approving means and approval result displaying means. The terminal functioning means allows one, or two or more terminals connected to the host computer via the network to function as a draftsman terminal used by a draftsman that creates an electric form template, an applicant terminal used by an applicant of an electric form and an approval officer terminal used by an approval officer for an electric form. The template creation supporting means supports, through the draftsman terminal, the creation of a form format by the draftsman in creating an electric form template including the form format of an application part. The template storing means stores the electric form template created by the draftsman. The electric form creation supporting means supports, through the applicant terminal, the writing of an electric form by the applicant on the basis of the electric form template with the electric form template displayed on the applicant terminal. The approving means displays the electric form written by the applicant on the approval officer terminal and obtains approval information through the approval officer terminal. The approval result displaying means displays the approval information on the applicant terminal.

The type of the network is not particularly specified and may be any of internet, intranet and the like.

The template creation supporting means is constructed to display a preview window of an electric form template on the draftsman terminal, and the approval route and the form format of the selected electric form are simultaneously displayed in the preview window.

At this point, in the case where the draftsman is to confirm the contents of the electric form template after the creation of the form format, if a long time has elapsed from the selection of the approval route of the electric form, the draftsman himself/herself may have forgotten which approval route was selected for the electric form. Therefore, the approval route of the selected electric form is displayed together with the form format in the preview window, so that the draftsman can remember the approval route of the selected electric form even when he/she has forgotten it.

The electric form creation supporting means displays, on the applicant terminal, an approval officer field in which the name of an approval officer included in the approval route of the electric form is input, and the approving means displays the electric form on the approval officer terminal of the approval officer having been input in the approval officer field by the applicant, so as to obtain the approval information of the approval officer through the approval officer terminal.

The host computer is provided with a memory in which form items of the electric form template and form item members for respectively defining the contents of the form items are stored. The template creation supporting means displays, on the draftsman terminal, a template creating window including the form items stored in the memory and a form item selecting window including the form item members stored in the memory, so that a form item member arbitrarily selected by the draftsman through the draftsman terminal in the form item selecting window can be set in a form item specified by the draftsman through the draftsman terminal in the template creating window. At least one of the form item members is a file attachment member to which a file is attachable.

Also, the template creation supporting means displays, on the draftsman terminal, the template creating window divided into a plurality of areas with the plural areas recognizable, and the item content of an area specified by the draftsman through the draftsman terminal can be arbitrarily determined in the template creating window.

The template creation supporting means allows the draftsman, through the draftsman terminal, to specify one, or two or more of applicants, and the electric form creation supporting means displays the electric form template on the applicant terminal of merely the applicant having been specified by the draftsman.

Figure 3:
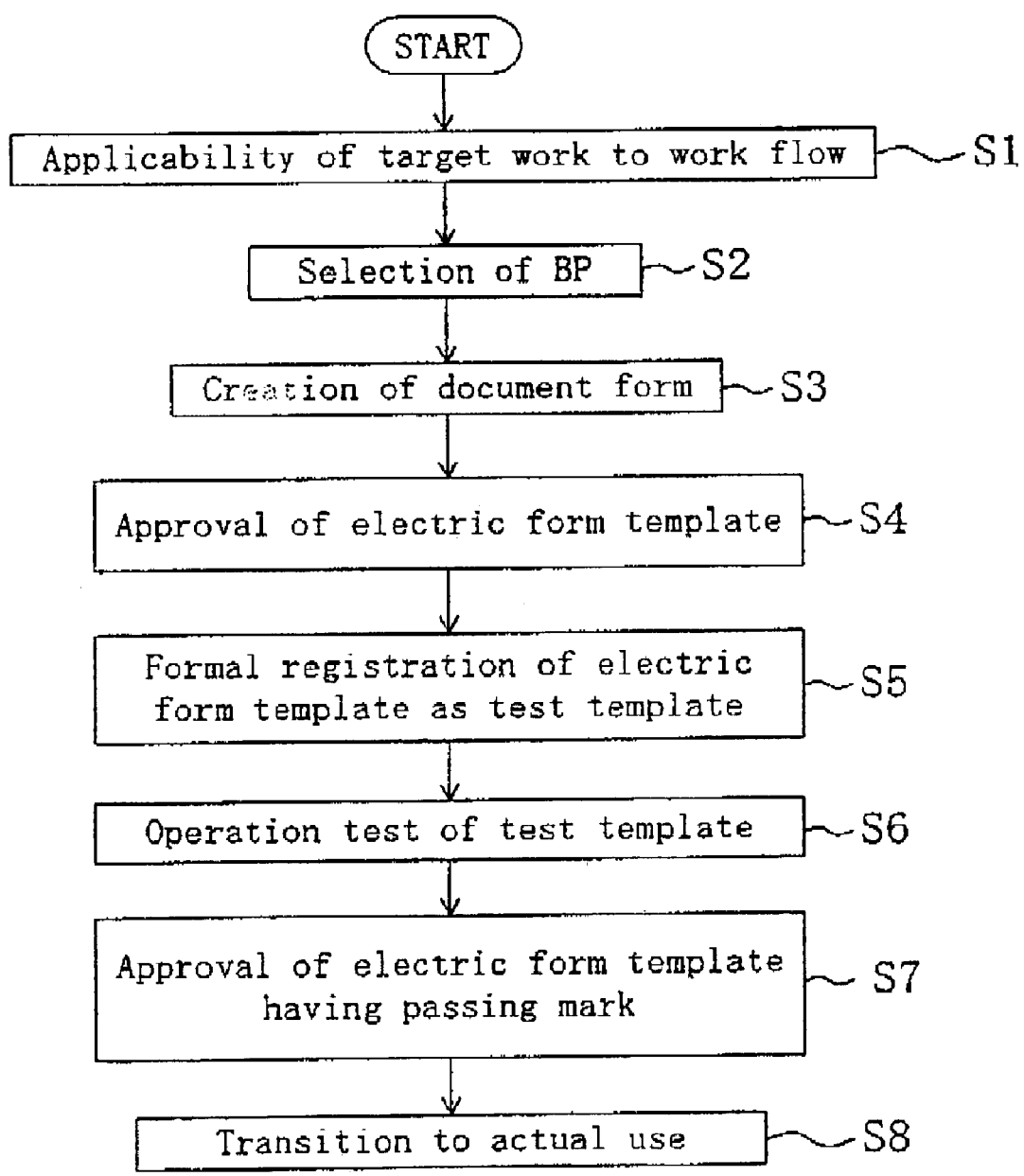
FIG. 3 is a flowchart for showing procedures in a work flow system constructed by using a system for supporting creation of an electric form format according to the embodiment.

FIG. 3 is a flowchart for showing procedures in the creation of an electric form template by using the system of this invention.

In step S1, a user (more specifically, a draftsman of an electric form template) determines whether or not a target work for which the electric form template is to be created is suitable to deal with through the work flow. When it is determined that the target work is suitable to deal with through the work flow, the user proceeds to step S2.

In step S2, the system presents a plurality of business processes (hereinafter referred to as the BPs) to the user, from which the user selects one BP proper for the target work. In other words, the system requests the user to select one BP optimal to the target work. At this point, a BP defines an approval route including an approval order of an electric form written on the basis of the electric form template created by using the present system when the electric form template is transit to an environment where it can be actually used for handling a work. It is noted that the system previously stores a plurality of BPs. Then, the system stores the BP (i.e., the approval route of an electric form) selected by the user.

Next, in step S3, the user creates a form format with the support by the system. In other words, the system requests the user to create a form format in step S3. At this point, a form format is an item of the electric form template.

Specifically, the system presents a plurality of form items and a plurality of form item members (both of which will be described in detail below) to the user, and defines a form item specified by the user by using a form item member specified by the user. Then, the system stores the defined form item (form format).

Next, in step S4, the system presents, to an approval officer, the electric form template that includes the selected BP and form format and is in an approval wait state, and the approval officer determines whether or not the electric form template is approved. Then, the system obtains approval information. In step S4, the approval processing is carried out in accordance with the BP previously specified with respect to an electric form created for determining whether or not the electric form template is approved.

In step S5, in the case where the approval officer approves the electric form template, a transactor registers the electric form template for test in the test server as a test template.

Next, in step S6, the system presents the user the test template having been registered for test in the test server. The user tests whether or not the registered test template properly operates on the work flow. When the user gives a passing mark to the test result, the system obtains information on approval of the user for the test result, and the flow proceeds to step S7.

In step S7, the system presents the approval officer the electric form template to which the passing mark has been given by the user. The approval officer determines whether or not the electric form template having obtained the passing mark is approved. Then, the system obtains approval information.

In step S8, the system places the created electric form template in a state where an electric form can be written by using the electric form template, so as to be used by the user. In this manner, an applicant that is to write an electric form can handle a work by using the created electric form template.

The procedures in steps S2 and S3 construct the template creation supporting means (address part creation supporting means and application part creation supporting means).

Now, the flow in a work handled by using an electric form template created by using the present system will be described.

An applicant that is to apply for approval activates a computer (applicant terminal). When the applicant activates the work flow system, a list of registered electric form templates is displayed on the display. At this point, electric form templates necessary for the applicant alone are listed in the list of the electric form templates. The applicant selects an electric form template suitable to a target work from the list. Then, the selected electric form template is displayed on the display. The applicant inputs predetermined data in respective items of the electric form template and sets an approval officer for the electric form, thereby writing the electric form (electric form creation supporting means). Thereafter, the system submits an e-mail for requesting the approval for the electric form to the approval officer terminal of an approval officer having been set by the applicant. The approval officer having received the e-mail determines whether or not the electric form is approved (approving means). The system stores the approval result of the approval officer, and displays the approval result on the applicant terminal (approval result displaying means).

Now, an example of the processing for creating an electric form template, creating an electric form and obtaining approval for an electric form by using the present system will be described in detail.

A draftsman of a drafting department activates the computer (draftsman terminal) 27. Herein, a draftsman of a drafting department means a person who creates an electric form template (hereinafter referred to as the draftsman). The draftsman makes an access to intranet, that is, a network within the enterprise, so that a top page of the intranet can be displayed on the display of the computer 27. Although the computer 27 herein corresponds to the draftsman terminal, the computer 27 may correspond to both the draftsman terminal and the applicant terminal. In other words, the draftsman may be identical to the above-described applicant that is to apply for approval.

Next, the draftsman inputs his/her user ID and password by using the keyboard and the mouse of the computer 27, and then, an item "work flow" is selected from items listed on the top page, so as to log in a work flow page. Thus, a list of previously registered electric form templates is displayed on the display. The draftsman selects a desired electric form template from the list. Thus, a setting window as shown in FIG. 4 is displayed on the display.

Now, respective procedures in steps S2 through S8 will be independently described.

(1) Step S2:

The setting window is a window in which the system requests the draftsman to, for example, input predetermined items. The draftsman inputs a form name in a form name field 1 and selects one BP from a pull-down list of a business process setting field 3 as shown in FIG. 4.

Figure 5:
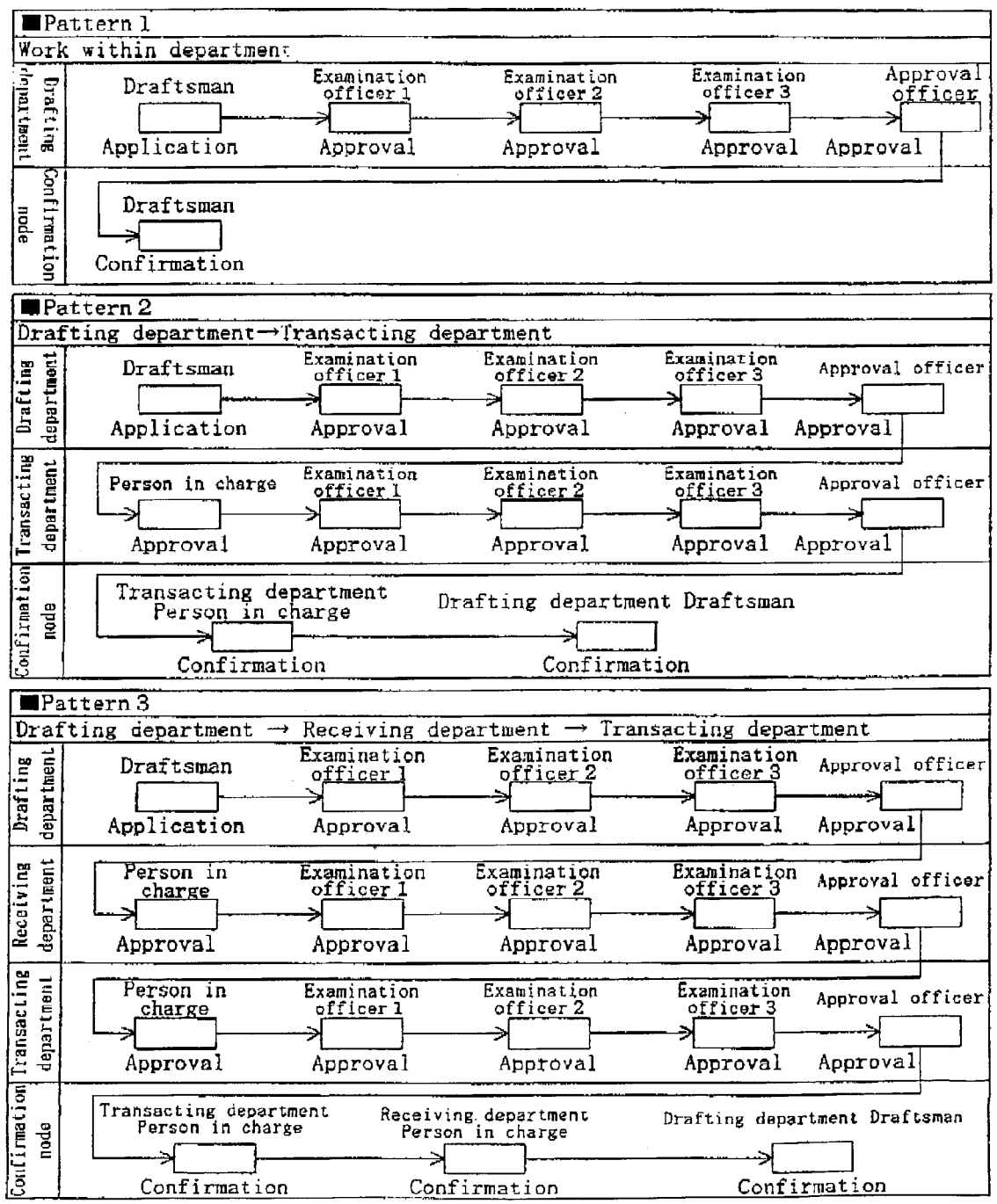
FIG. 5 is a schematic diagram of the structures of BPs according to the embodiment.

It is assumed in this embodiment that the system stores patterns 1 through 3 shown in FIG. 5 as the BPs. In the pattern 1, the approval is requested for merely in the drafting department to which the draftsman belongs. In the pattern 2, the approval is requested for not only in the drafting department but also in a transacting department. In the pattern 3, the approval is requested for in a receiving department and the transacting department after the drafting department.

The drafting department is composed of the draftsman, an examination officer (corresponding to an advance approval officer; the same applies hereinafter) and an approval officer (namely, an ultimate approval officer in the department; the same applies hereinafter), the transacting department is composed of a person in charge, an examination officer and an approval officer, and the reception department is composed of a person in charge, an examination officer and an approval officer. When the draftsman employs, for example, the pattern 1, in applying for approval by using an electric form created by using the present system, the electric form flows in the order of the draftsman of the drafting department, the examination officer of the drafting department and the approval officer of the drafting department, and finally returns to the draftsman of the drafting department. However, a person involved in the approval in the drafting department is determined in writing an electric form by inputting data in the electric form template created by using the present system. The total number of BPs, the number of departments requested for approval in each BP, the number of persons involved in each department requested for approval and the like are arbitrary. Also, the approval patterns are not limited to the serial patterns described above but may be a pattern of a parallel approval route in which an electric form flows from the draftsman simultaneously in parallel to a plurality of examination officers to reach an ultimate approval officer or a pattern of a parallel route in which an electric form flows from one department simultaneously in parallel to a plurality of departments.

It is assumed in this example that the draftsman selects the pattern 3 from the pull-down list. Accordingly, the approval route of this example is the pattern 3. Although one BP is herein selected from the plural BPs, in the case where, for example, the pattern 1 is a route composed of persons belonging to the drafting department and the pattern 2 is a route composed of persons belonging to the transacting department, the pattern 1 and the pattern 2 may be both selected. In this case, the electric form flows in the order of the drafting department and the transacting department. Through this selection, a BP address field 77 in a form image viewing window is automatically set as described later.

Figure 6:
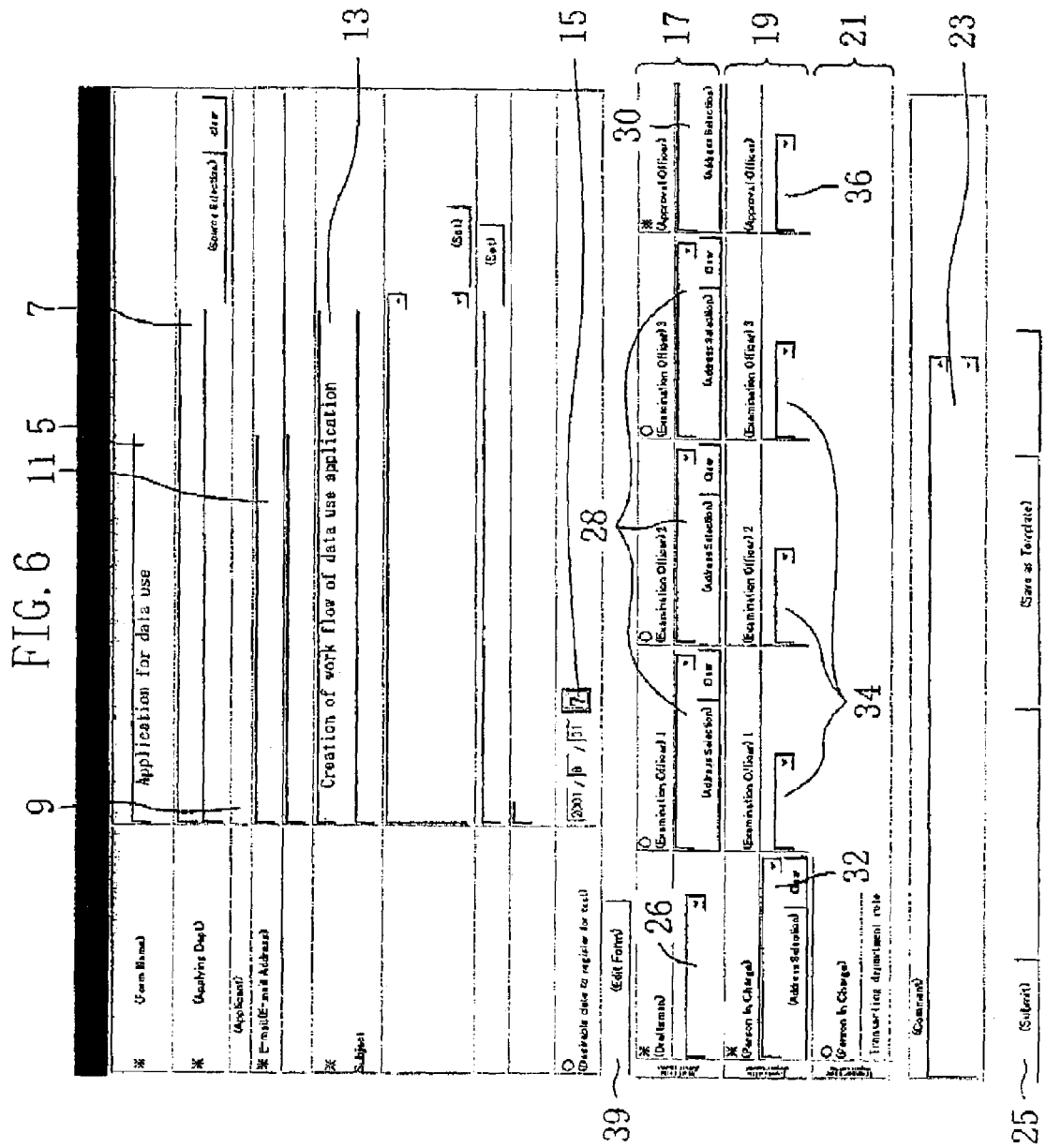
FIG. 6 is a diagram of a creating window according to the embodiment.

After inputting the data in the setting window, when the draftsman clicks a creation button, the system displays a creating window shown in FIG. 6. The creating window is an electric form template previously registered in the system.

The creating window includes a form name field 5, an applying department field 7, an applicant field 9, an e-mail field 11, a subject field 13, a desirable test registration date field 15, a drafting department field 17, an examining department field 19, a transacting department field 21, a comment field 23, a submit button 25, a template save button and the like.

In the creating window, the system requests the draftsman to input the following data. In other words, the draftsman inputs data in accordance with the creating window.

In the form name field 5, the form name having been set in the setting window is automatically displayed, whereas the form name can be changed by the draftsman in the creating window.

In the applying department field 7, the department of the draftsman is automatically displayed on the basis of draftsman information of the draftsman stored in the system. In the case where the draftsman clicks a source selection button, the applying department can be changed by the draftsman.

In the applicant field 9, the name of the draftsman is automatically displayed.

In the e-mail field 11, the mail address of the draftsman is automatically displayed, whereas the mail address can be changed by the draftsman.

In the subject field 13, the subject is input by the draftsman.

In the desirable test registration date field 15, a date on which the draftsman desires to register the electric form template for test in the test server is input by the draftsman.

The drafting department field 17 includes a draftsman field 26, an examination officer field 28 and an approval officer field 30. In the draftsman field 26, the name of the draftsman is automatically displayed. In the examination officer field 28, the name of an examination officer is input by the draftsman. A person suitable for the examination is selected as the examination officer, and a superior or the like of the draftsman belonging to the drafting department is generally selected. In the approval officer field 30, the name of an approval officer is input by the draftsman. The approval officer is a superior or the like of the draftsman belonging to the drafting department.

The examining department field 19 includes a person in charge field 32, an examination officer field 34 and an approval officer field 36. In the person in charge field 32, the name of a person in charge of the examining department is input. The person in charge is selected and input by the draftsman. In general, a person previously consulted by the drafting department is selected as the person in charge. The examination officer and the approval officer of the examining department are selected by the person in charge of the examining department, and therefore, the system does not request the draftsman to input the data in the examination officer field 34 and the approval officer field 36 at this point. In this example, an IT department is assumed to be employed as the examining department.

In the transacting department field 21, the transacting department is automatically displayed.

The drafting department field 17, the examining department field 19 and the transacting department field 21 correspond to the approval order of the BP specified in the setting window. Also, the drafting department field 17, the examining department field 19 and the transacting department field 21 together construct the previously set approval route of the template.

In the comment field 23, special mention or the like desired to be delivered to the examination officer or the like of the drafting department in asking for confirmation of the contents of the electric form template is input by the draftsman. However, the input in the comment field 23 is arbitrary.

When the draftsman clicks the template save button, the system stores the data input in the creating window.

A template approving window corresponds to the creating window.

Figure 7:
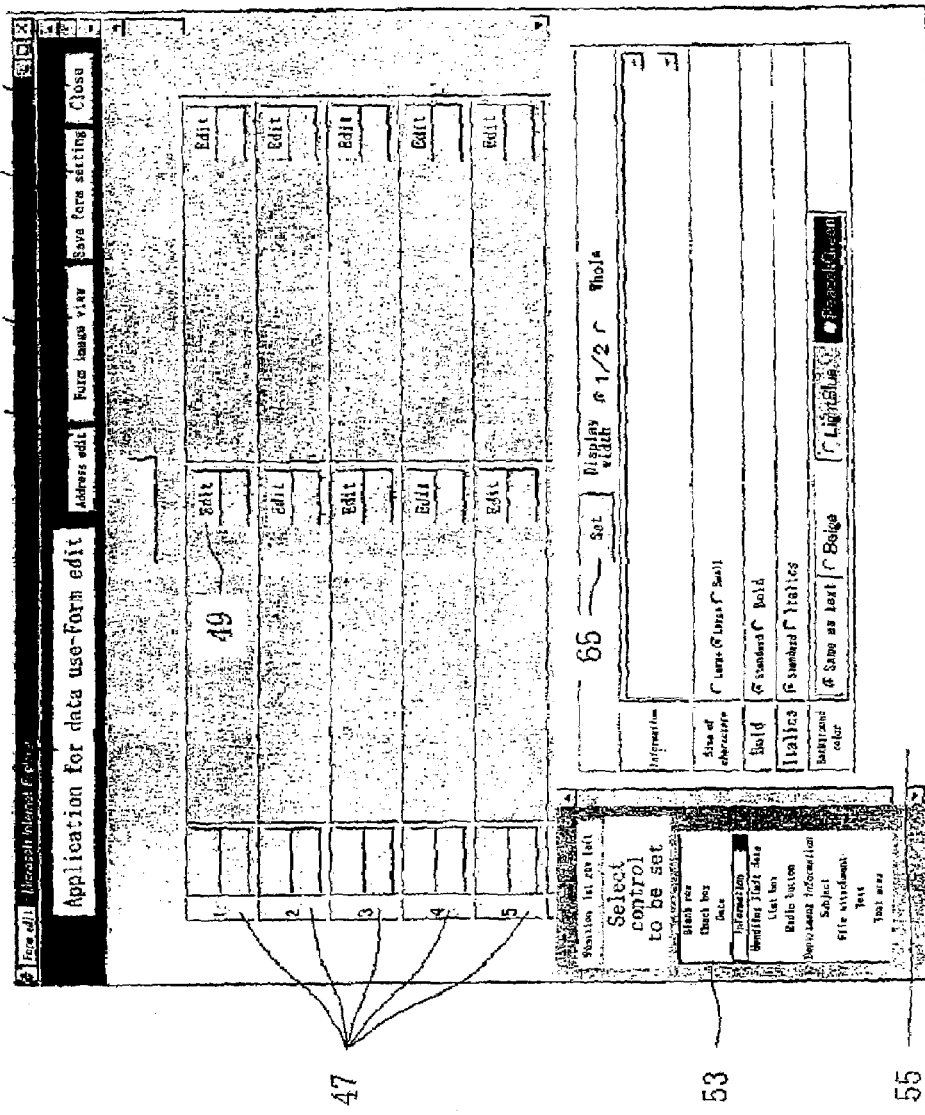
FIG. 7 is a diagram of a form item editing window according to the embodiment.

(2) Step S3:

Next, when the draftsman clicks a form edit button 39 in the creating window, the system displays a form item editing window shown in FIG. 7. In the form editing window, the system requests the draftsman to input predetermined items. In this form editing window, the form format is created.

The form editing window includes a form item layout window 41, an address edit button 43, a form image view button 45, a form setting save button 46, a close button 48 and the like. The form item layout window 41 includes form items 47 each divided into a plurality of areas, and is displayed as a table in which eighty form items 47 are arranged in forty rows by two columns. However, a plurality of rows may be combined to be used as one form item, or two form items laterally adjacent to each other may be combined to be used as one form item. Although the number of form items 47 is eighty in this embodiment, the number of form items 47 is arbitrary. Each form item 47 has an edit button 49. Also, the form editing window corresponds to a template creating window.

Next, when the draftsman clicks the edit button 49 of any form item 47, the system displays an item editing window 51 for that form item. The draftsman selects a form item member of that form item 47 from a list field 53 disposed in a left area of the item editing window 51, and the system displays a form item setting window 55 in a right area of the item editing window 51. The list field 53 corresponds to a form item selecting window.

Figure 8:
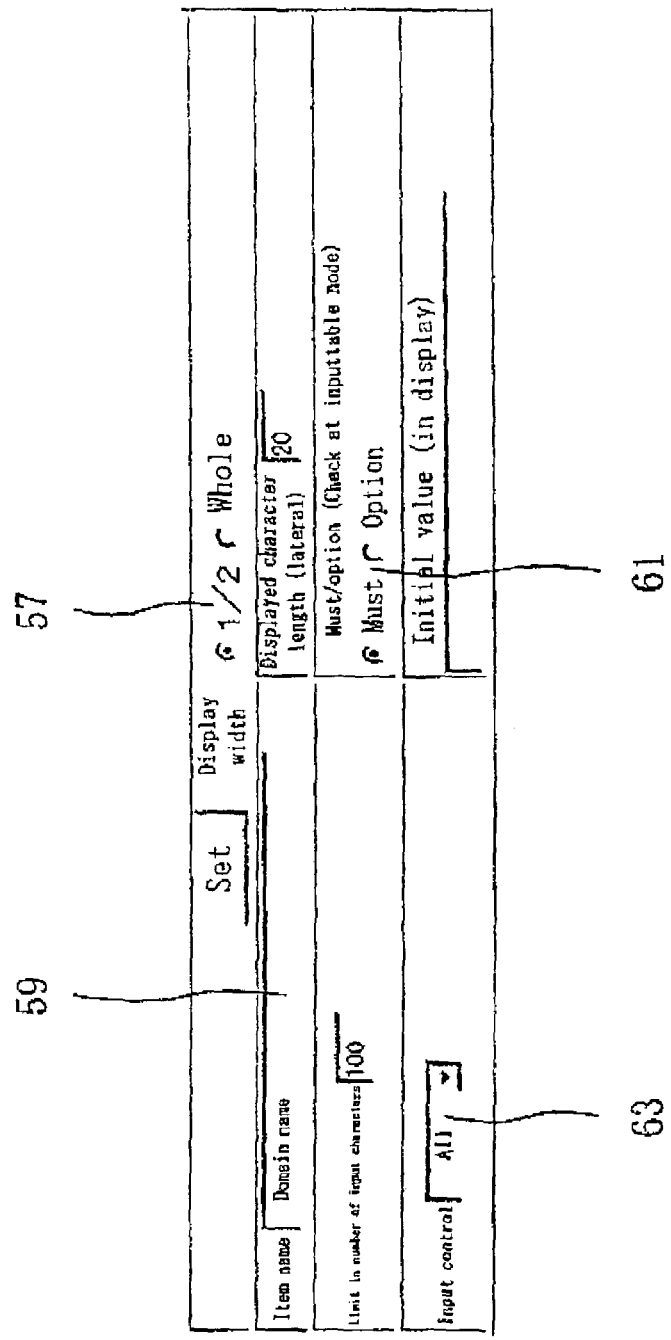
FIG. 8 is a diagram of a form item setting window according to the embodiment.

At this point, the form item setting window 55 includes, as shown in FIG. 8, at least a display width check box 57, an item name field 59, a must/option check box 61 and an input control field 63.

Figure 9:
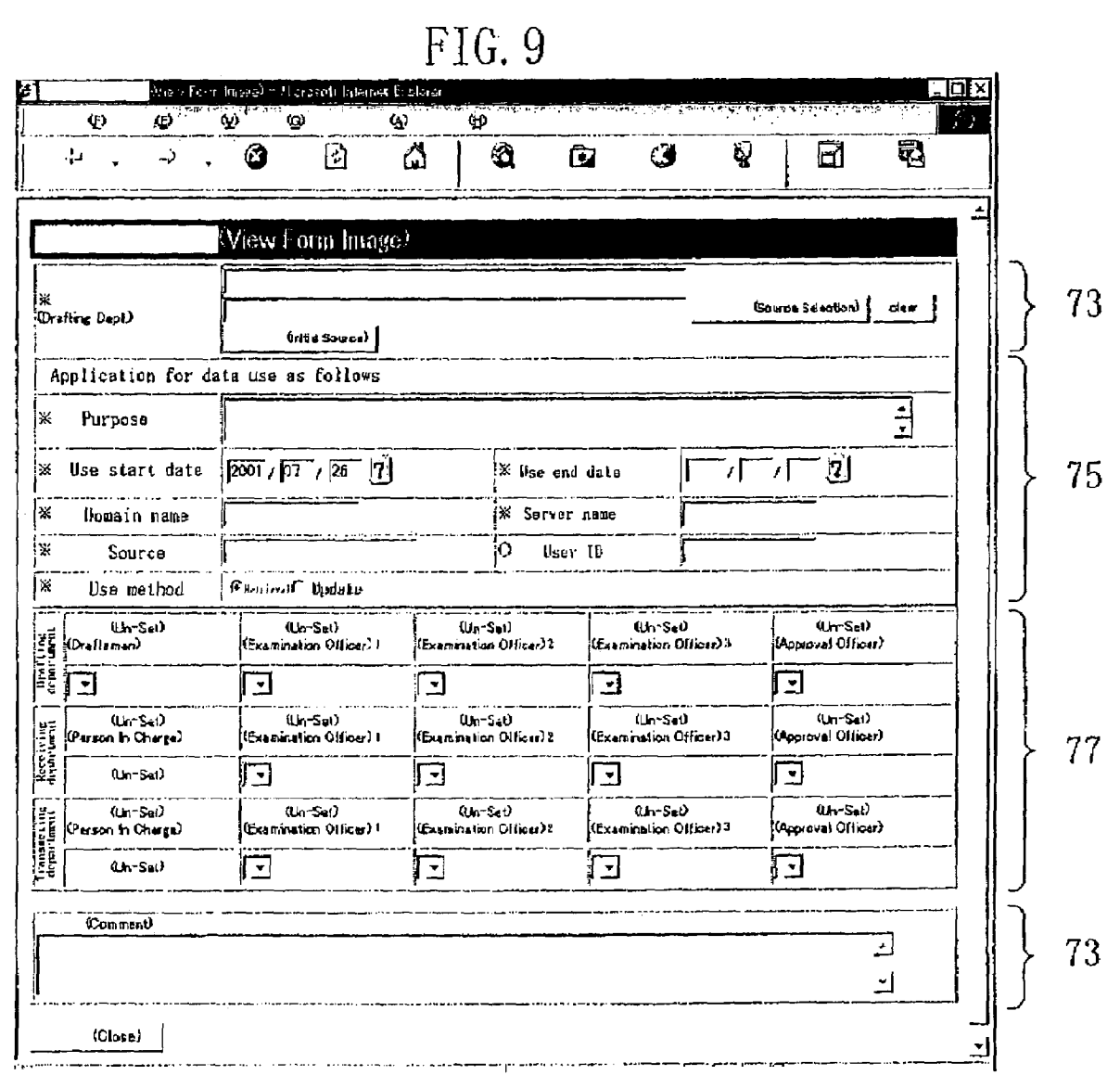

In the display width check box 57, the draftsman selects "½" or "whole", so that the system can determine whether the right or left half or the whole of the form item 47 is used. In the item name field 59, the title of the form item 47 is input in 200 characters or less. In the must/option check box 61, the draftsman selects "must" or "option". As shown in FIG. 9, when the draftsman selects "must", the form item is marked with "✖" in a form image viewing window described later, and when the draftsman selects "option", the form item is marked with "◯". It is noted that a form item marked with "✖" is an item in which data must be input at the stage of writing an electric form, and when no data is input in such an item, a warning is issued after writing the electric form. Alternatively, a form item marked with "◯" is an item in which data is arbitrarily input, and even when no data is input in such an item, a warning is not issued. In the input control field 63, the draftsman selects "drafting department", "receiving department", "transacting department" or "all" from a pull-down list. When data are input in the electric form template created by using the present system in the selected department(s), data related to the form item can be input or modified in writing an electric form. In the case where "all" is selected, an applicant for applying for approval can input or modify data in any of the departments.

Also, the system stores, in the list field 53, "file attachment", "handling limit date", "department information" and the like as shown in FIG. 7 as the form item members whose formats are respectively defined. At this point, a form item member determines the content of a form item 47. Although "file attachment" and the like are stored as the form item members in this example, the number and the contents of form item members are arbitrary.

For example, when the form item 47 is defined as "file attachment", data can be attached by using the resultant electric form template. In the resultant electric form template, an icon designated as "file attachment" is displayed in the form item 47 defined as "file attachment". When an applicant for applying for approval operates the "file attachment" icon, a file specified by the applicant for applying for approval is attached to the electric form. Thus, an examination officer or an approval officer for the electric form can read the file. It is noted that the system admits, as attached data, files with file extensions ".pdf", ".doc", ".xls", ".txt", ".jpg", ".htm", ".html", ".ppt", ".tif" and the like.

Next, the draftsman clicks a set button 65 in the form item setting window 55, so that the system can display the form item layout window 41 in which the item name and the like are input in the form item.

Figure 10:
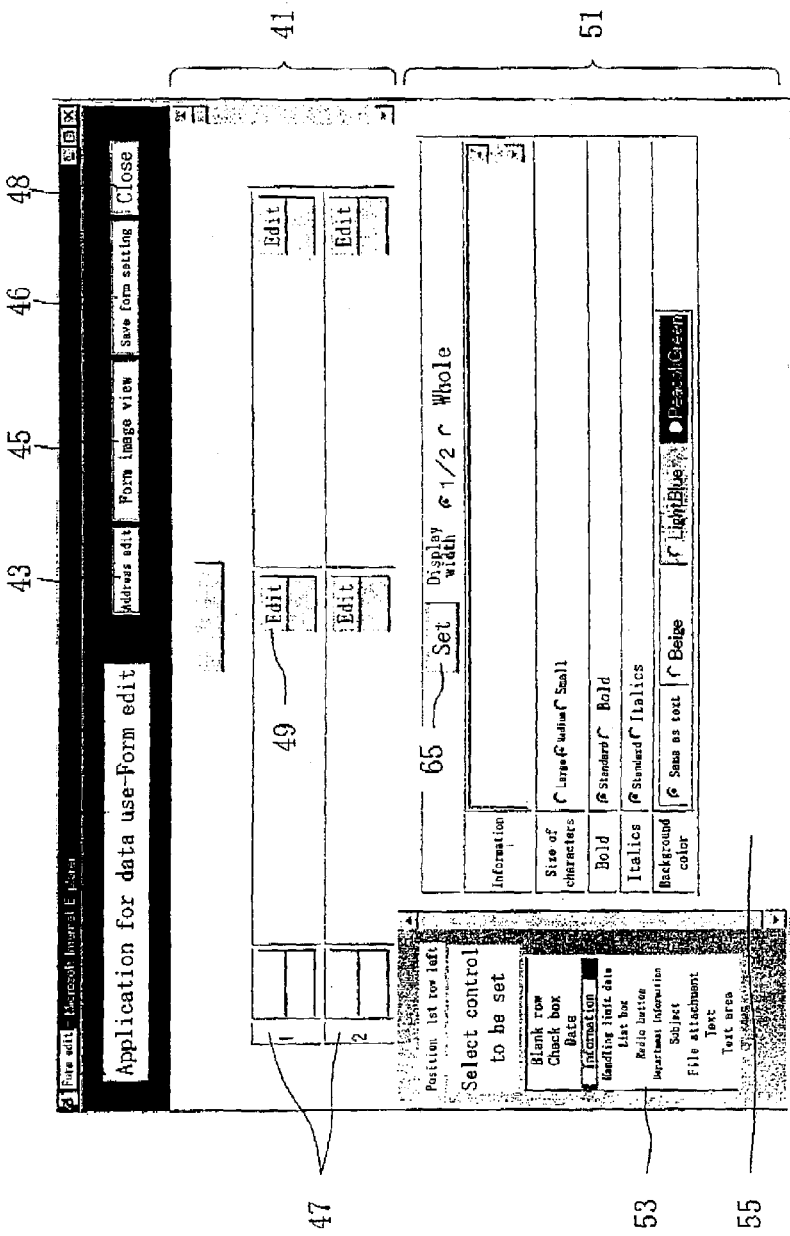
FIG. 10 is a diagram of a form item editing window according to the embodiment.
Figure 11:
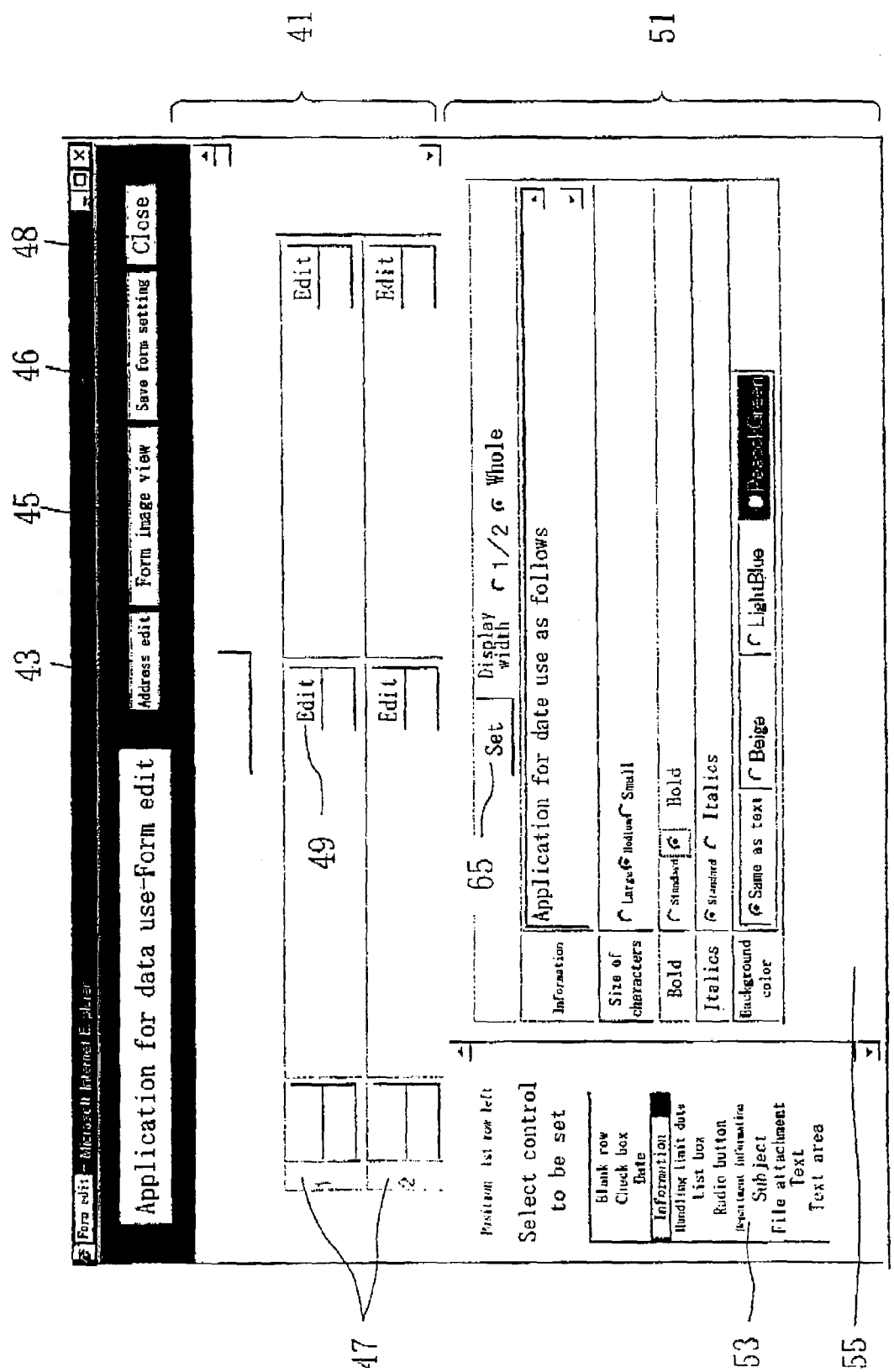
FIG. 11 is another diagram of the form item editing window according to the embodiment.
Figure 12:
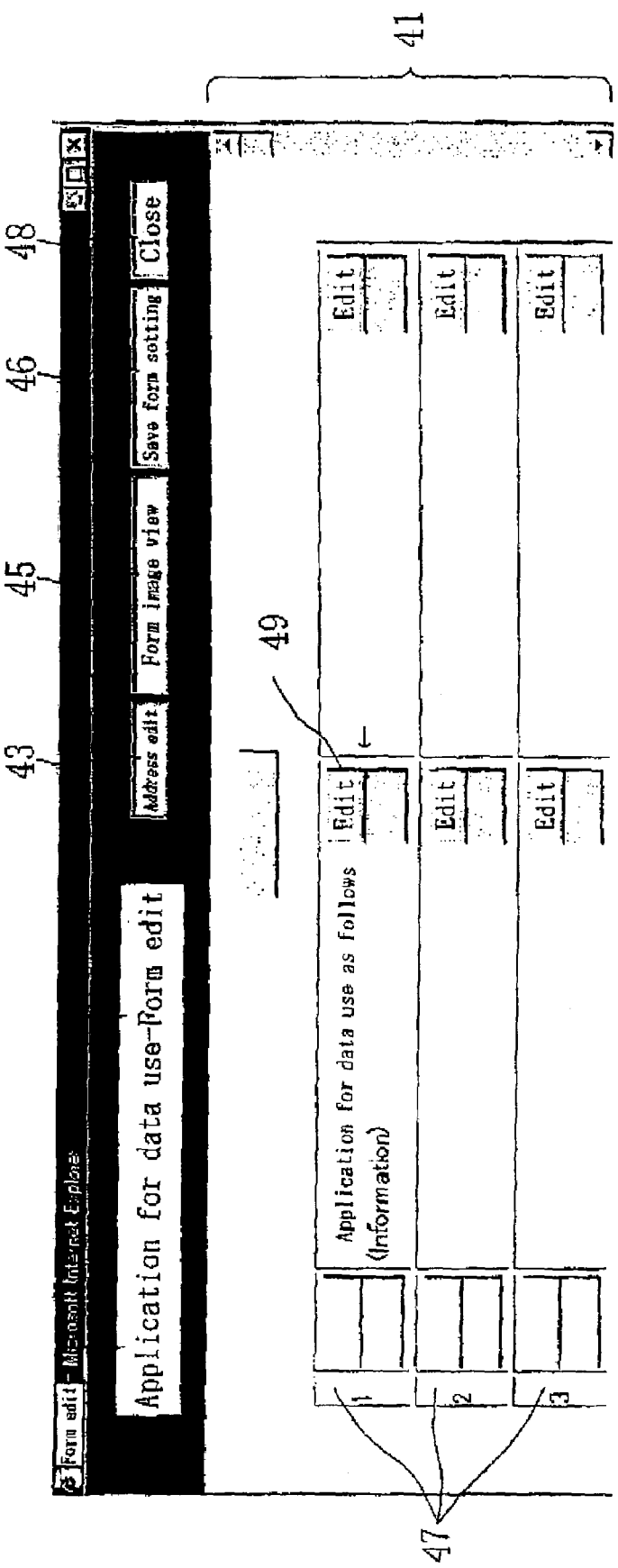
FIG. 12 is another diagram of the form item editing window according to the embodiment.

At this point, as an example of the edition of the form item 47, it is assumed that the draftsman clicks the edit button 49 of the first form item 47. When the draftsman clicks the edit button 49 of the first form item 47, the system displays the item editing window 51 as shown in FIG. 10. When the draftsman selects "information" from the list field 53, the form item setting window 55 is displayed. Then, as shown in FIG. 11, the draftsman inputs the content of the information and selects "large", "medium" or "small" in a character size box. Thereafter, the draftsman clicks the set button 65. Thus, the system displays the form item layout window 41 as shown in FIG. 12.

Next, the draftsman confirms the contents of the form item 47 in the form item layout window 41.

At this point, when the draftsman clicks the edit button 49 of any form item 47, the contents of that form item 47 can be modified. After modifying the content, the draftsman clicks the set button 65 again.

Next, when the draftsman clicks the address edit button 43, the system displays an address editing window as shown in FIG. 13. An address field is displayed as a list composed of a plurality of rows. In this window, the draftsman edits an address field and the like in which a circulation route is input in writing an electric form by inputting data in the electric form template created by the present system. However, since standard item names and the like are previously displayed in an item name field 67 and the like described below, the draftsman edits the item name field 67 and the like in the address editing window only when any item name should be changed. FIG. 13 shows an address editing window displayed when the pattern 3 has been selected by the draftsman.

The address editing window includes the item name field 67, a node field 69 and the like, and the node filed 69 includes a first name field, a second name field, a must/option check box and the like.

In the item name field 67, the draftsman inputs the name or the like of a department applying for data use. The draftsman is admitted to change the name of the department. In the first name field, the draftsman inputs a Japanese name like "Kiansha". In the second name field, the draftsman inputs an English name corresponding to the Japanese name only when the English name like "Draftsman" is necessary. In the must/option check box, the draftsman selects "must" or "option". When "must" is selected, the system displays a mark "✖" in the form image viewing window, and when "option" is selected, the system displays a mark "◯". At this point, the draftsman cannot input the names of persons corresponding to an approval officer and the like of the department applying for data use. The names are input by an applicant or the like for applying for approval in writing an electric form by inputting data in the electric form template created by using the present system. However, when no examination officer is specified, the electric form is set to flow to an examination officer or an approval officer subsequently specified. The data input in this address editing window is used for the notation of the BP address field 77 in the electric form image viewing window shown in FIG. 9.

After inputting the data in the item name field 67 and the like in the address editing window, the draftsman clicks an address setting save button 71. Thus, the system stores the data input in the address editing window. Thereafter, when the draftsman clicks a close button, the system displays the form item editing window of FIG. 7 again.

Next, the draftsman clicks the form image viewing button 45 in the form item editing window, thereby previewing the form image viewing window shown in FIG. 9. This form image viewing window is equivalent to a window displayed in writing an electric form by using the electric form template when it is usable for handling a work. Then, the draftsman confirms the contents of the form image viewing window.

The form image viewing window includes a standard item 73, an edition item 75, the BP address field 77 and the like. The standard item 73 is indispensable in the form image viewing window. Also, in an upper portion of the form image viewing window, "form image view" is displayed. In this case, the form format is constructed on the basis of the edition item 75, the approval route of an electric form is constructed on the basis of the BP address field 77 and a preview window is constructed on the basis of the form image viewing window.

The standard item 73 includes a drafting department field and a comment field. The edition item 75 is constructed by using the form item 47 having been set in the above-described form item editing window. The BP address field 77 is constructed by using the BP (namely, the pattern 3 in this example) having been set in the above-described setting window. After confirming the contents of the form image viewing window, the draftsman clicks a close button, so that the system can display the form item editing window of FIG. 7 again.

At this point, when the draftsman clicks the form setting save button 46 in the form item editing window, the system stores the data having been input in the form item editing window. Alternatively, when the draftsman clicks the close button 48 in the form item editing window, the system displays the creating window of FIG. 6 again.

(3) Step S4:

Next, the draftsman clicks the submit button 25 in the creating window. Thus, the system submits an e-mail for requesting confirmation and examination of or approval for the contents of the form image viewing window to the computer 29 of the examination officer of the drafting department having been input in the examination officer field 28 of FIG. 6 by the draftsman.

Figure 14:
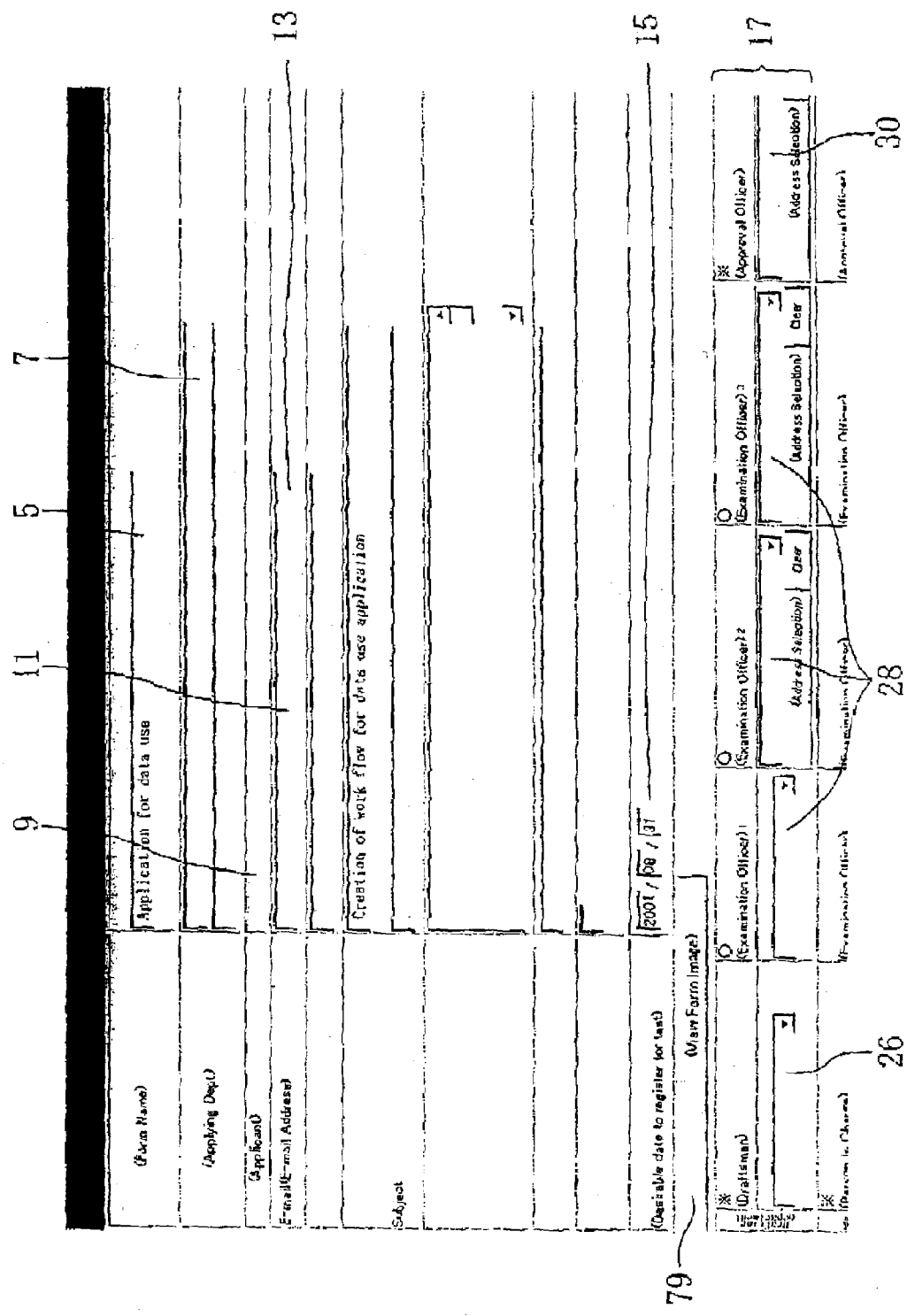
FIG. 14 is a diagram of a confirming window according to the embodiment.

Next, the examination officer of the drafting department having received the email activates the intranet of the computer 29. Thus, the top page of the intranet is displayed on the display. Next, the examination officer of the drafting department inputs his/her user ID and password. Thereafter, the item "work flow" is selected in the top page, so as to log in the work flow page. Next, the examination officer of the drafting department clicks the corresponding matter in a receive tray in the work flow page, so that a confirming window as shown in FIG. 14 can be displayed on the display. Although the applying department field 7, the approval officer field 30 and the like are blank in this confirming window, data are actually displayed in the applying department field 7 and the like.

Figure 15:
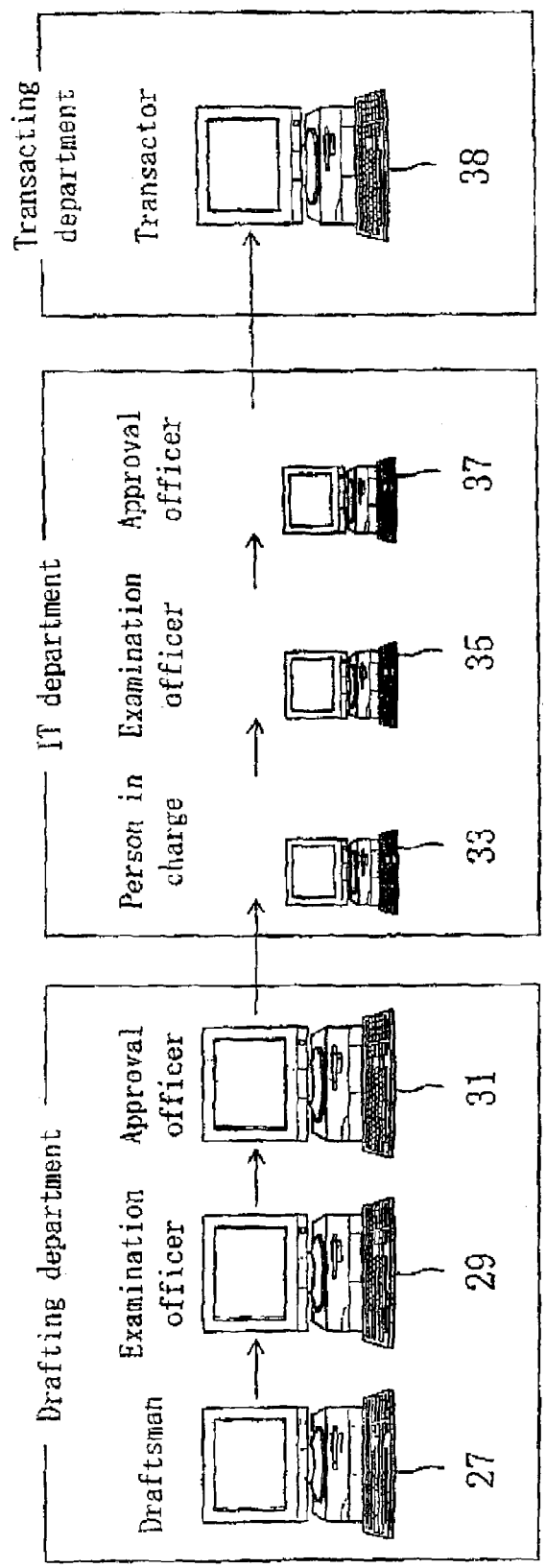
FIG. 15 is a schematic diagram of a route for confirmation and examination or approval of the contents of a form image viewing window according to the embodiment.

Next, the examination officer of the drafting department clicks a form image view button 79, so as to display the form image viewing window of FIG. 9 on the display. Thus, the examination officer of the drafting department confirms the contents of the form image viewing window. At this point, in the case where it is judged that the contents of the form image viewing window are in order, the examination officer of the drafting department clicks an approval button (not shown). At this point, the system stores information that the examination officer of the drafting department has approved. Thereafter, the system submits an e-mail for requesting the confirmation and the examination of or the approval for the contents of the form image viewing window to the computer 31 of the approval officer of the drafting department having been input in the approval officer field 30 of FIG. 6 by the draftsman. Then, the approval officer of the drafting department having received the e-mail confirms the contents of the form image viewing window in the same manner as the examination officer of the drafting department. Thereafter, this flow proceeds, as shown in FIG. 15, in the order of the person in charge of the IT department having been input in the person in charge field 32 of FIG. 6 by the draftsman, the examination officer of the IT department having been input in the examination officer field 34 of FIG. 6 by the person in charge and the approval officer of the IT department having been input in the approval officer field 36 of FIG. 6 by the person in charge.

If, for example, the examination officer of the IT department judges that the contents of the form image viewing window are not in order, the examination officer of the IT department clicks a denial button (not shown). Thus, the system submits an e-mail for informing that the examination officer of the IT department has denied the contents of the form image viewing window to the computer 27 of the draftsman of the drafting department. Then, the flow returns to step S2 so as to proceed in the order of steps S3 and S4.

Although the contents of the form image viewing window are confirmed by the approval officer and the like of the drafting department and the approval officer and the like of the IT department in this example, the number of departments and the number of persons like an approval officer belonging to each department employed for confirming the contents of the form image viewing window are arbitrary.

Next, when the approval officer of the IT department clicks an approval button, the system stores information that the approval officer of the IT department has approved, and notifies the computer 38 of the person in charge of the transacting department automatically displayed in the person in charge field of the transacting department of FIG. 6 of the approval for the contents of the form image viewing window of all the approval officers and the like belonging to the drafting department and the IT department.

(4) Step S5:

The person in charge of the transacting department (hereinafter referred to as the transactor) logs in the work flow page in the above-described manner. Then, the transactor clicks the corresponding matter in a receive tray in the work flow page, so as to display the confirming window of FIG. 14 on the display. Although the applying department field 7 and the like are blank in this confirming window, the data are actually displayed in the applying department field 7 and the like.

Next, the transactor registers the created electric form template for test in the test server 8 as a test template on the desirable date having been input in the desirable test registration date field 15 in the creating window.

(5) Step S6:

Next, the system submits an e-mail for requesting to check whether or not the test template is normally operated to the computer 27 of the draftsman of the drafting department, and registers, in a receive tray of the draftsman in the work flow page, a matter that it should be confirmed that the electric form template is operable on the work flow.

Next, the draftsman having received the e-mail writes an electric form by using the test template on the work flow system registered in the test server 8 equivalent to the work flow system registered in the server 4 in the same manner as in handling an actual work. After the writing, an approval is requested for, so that the examination officer and the like of the drafting department can determine whether or not the electric form is approved. Then, the examination officer and the like of the drafting department confirms the operation contents and the like of the test template registered for test in the test server 8.

Figure 16:
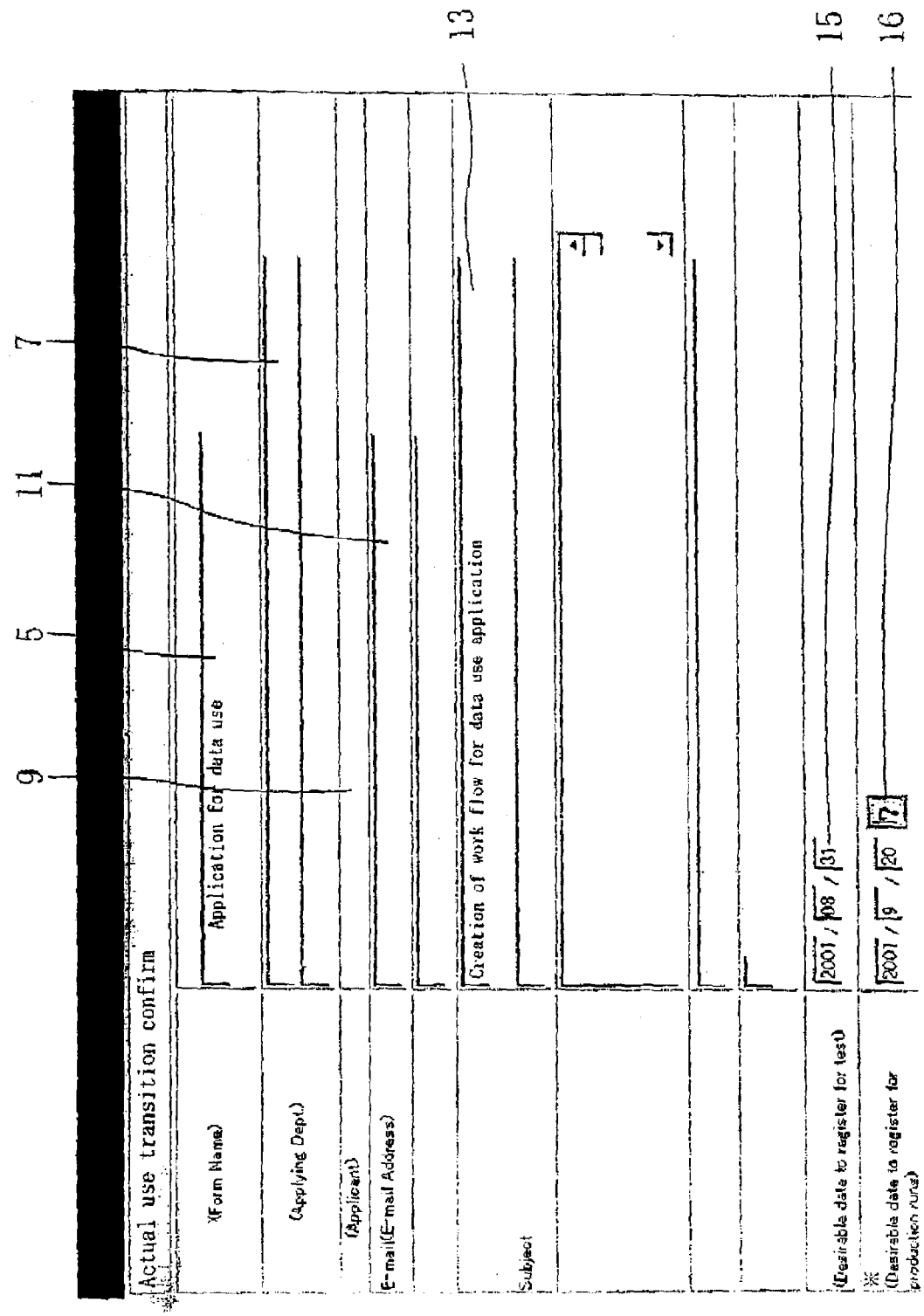
FIG. 16 is a diagram of an actual use transition confirming window according to the embodiment.

When the draftsman satisfies the result of the test, the draftsman logs in the work flow page in the aforementioned manner. Next, the draftsman clicks the corresponding matter in the receive tray on the work flow page, so as to display a list of files related to the work flow on the display. When the draftsman clicks the corresponding matter in the files, a production runs transition confirming window as shown in FIG. 16 is displayed on the display. Then, the draftsman inputs a date on which the electric form template is desired to be operable on the work flow system in a desirable production runs registration date field 16. Thereafter, the draftsman clicks an approval button (not shown). Thus, the system stores information that the draftsman has approved the test result. Although the draftsman herein confirms the operation contents of the electric form template, the examination officer or the like of the drafting department may confirm them instead of the draftsman.

(6) Step S7:

Next, the system submits an e-mail for requesting for re-confirmation and re-examination of the contents of the form image viewing window to the computer 29 of the examination officer of the drafting department having been input in the examination officer field 28 of FIG. 6 by the draftsman.

Then, the examination officer of the drafting department having received the email logs in the work flow page in the aforementioned manner. Next, the examination officer of the drafting department clicks the corresponding matter in the receive tray in the work flow page, so as to display the production runs transition confirming window shown in FIG. 16 on the display. Although the applying department field 7 and the like are blank in this production runs transition confirming window, data are actually displayed in the applying department field 7 and the like. Next, the examination officer of the drafting department clicks a form image view button (not shown), so as to display the form image viewing window shown in FIG. 9 on the display. Thus, the examination officer of the drafting department confirms the contents of the form image viewing window. At this point, when it is judged that the contents of the form image viewing window are in order, the examination officer of the drafting department clicks an approval button (not shown). Thus, the system stores information that the examination officer of the drafting department has approved. Thereafter, the system submits an e-mail for requesting for the re-confirmation and re-approval for the contents of the form image viewing window to the computer 31 of the approval officer of the drafting department having been input in the approval officer field 30 of FIG. 6 by the draftsman. Then, the approval officer of the drafting department having received the e-mail confirms the contents of the form image viewing window in the same manner as the examination officer of the drafting department. When it is judged that the contents of the form image viewing window are in order, the approval officer of the drafting department clicks the approval button. Thus, the system stores information that the approval officer of the drafting department has approved. At the same time, the system registers, in the receive tray on the work flow page of the transactor of the transacting department automatically displayed in the person in charge field of the transacting department of FIG. 6, a matter for asking for making the electric form template operable on the work flow system.

(7) Step S8:

Next, the transactor logs in the work flow page in the aforementioned manner. Then, the transactor clicks the corresponding matter in the receive tray on the work flow page, so as to display the production runs transition confirming window of FIG. 16 on the display. Although the applying department field 7 and the like are blank in this production runs transition confirming window, data are actually displayed in the applying department field 7 and the like. Then, the transactor allows the electric form template to be operated on the work flow system on the desirable date having been input in the desirable production runs registration date field 16 in the production runs transition confirming window. Thereafter, the system submits an e-mail for requesting for confirmation of the operation of the electric form template on the work flow system to the computer 27 of the draftsman of the drafting department. The draftsman having received the e-mail activates the intranet of the computer 27. Thus, the top page of the intranet is displayed on the display. Next, the draftsman inputs his/her user ID and password. Then, the item "work flow" is selected on the top page, so as to log in the work flow page. Next, the draftsman clicks the corresponding matter in the receive tray on the work flow page, so as to display a production runs transition complete confirming window as shown in FIG. 17 on the display. In the production runs transition complete confirming window, it is informed that the electric form template has been operable on the work flow system. Although the applying department field 7 and the like are blank in this production runs transition complete confirming window, data are actually displayed in the applying department field 7 and the like. After confirming the operation, the draftsman clicks a confirmation button (not shown) in the production runs transition complete confirming window.

In this manner, the electric form template created by using the present system can be used for handling a work.

According to this embodiment, since a draftsman selects one BP from the three BPs stored in the system, there is no need for the draftsman to create a BP. Accordingly, the draftsman can easily create an electric form template.

A draftsman creates the edit item 75 by clicking the edit button 49 of a form item 47 arbitrarily selected from the eighty form items 47 shown in the form item layout window 41. Also, the content of the selected form item 47 is determined by using a form item member arbitrarily selected by the draftsman in the list field 53. In addition, the form item 47 can be freely changed in its content at the stage of edition. Accordingly, the draftsman can freely create the form item 47.

The computer 27 of the draftsman is connected to the computers 29 and 35 of the examination officers and the computers 31 and 37 of the approval officers via the network, and hence, the draftsman can be located in a place far away from the examination officers and the approval officers. Therefore, even in the case where the location of the draftsman is different from the location of the examination officer and the approval officer (for example, in the case where one is in the head office and the other is in a branch office), drafting and approval can be rapidly carried out.

Since a draftsman selects one BP from the three BPs, an applicant for applying for approval by using a registered electric form template can use the electric form template created by using the present system in any of a variety of work systems.

Since the pattern 3 is constructed by serially connecting the drafting department, the receiving department and the transacting department, an applicant for applying for approval by using a registered electric form template can use the electric form template created by using the present system in any of a variety of work systems.

The names of an examination officer and an approval officer are input in the BP address field 77 of the electric form template in writing an electric form by inputting data in the electric form template. Therefore, even when there are a plurality of work systems different in examination officers and approval officers alone, an applicant for applying for approval by using a registered electric form template can write electric forms by using the same electric form template.

Since the form item 47 can be constructed by using a file-attachable program, a draftsman can easily create an electric form template to which data can be attached.

Since the setting window for selecting a BP and the form editing window for editing the form item 47 are displayed at different stages, a draftsman can be free from confusion. Also, since a BP is selected first, a draftsman can be prevented from making a mistake in selecting a BP.

Since the BP address field 77 is displayed together with the edit item 75 in the form image viewing window, even when a draftsman has forgotten the selected BP, he/she can remember it.

Even when a draftsman does not have technical knowledge necessary for defining the control of a BP, he/she can easily create an electric form template.

When an applicant for applying for approval activates the work flow system, the list of electric form templates necessary for the applicant alone is displayed on the display. Therefore, the applicant can save time in selecting an electric form template.

Since the system submits the e-mails for requesting for confirmation and examination of or approval for the contents of the form image viewing window to the computer 29 of the examination officer of the drafting department and the like, the confirmation and the examination of or the approval for the contents of the form image viewing window can be rapidly and easily practiced.

Although the system for supporting creation of an electric form template is described in this embodiment, the embodiment is applicable to creation of a template of an electric filing document or the like.

What is claimed is:

1. An electric form handling system in which an applicant is allowed to write an electric form having an application part where an application item to be approved is input and an address part where one or more approval officers to approve said application item are specified, and in which application filing of said electric form by said applicant and approval for said electric form by said approval officers specified by said applicant are practiced via a computer network, comprising:

template creation supporting means for creating an electric form template and storing the created electric form template by request, the electric form template comprising an application part having a plurality of item fields to which the application item can be input and an address part having an approval officer field which is blank and in which the approval officers can be specified, wherein said template creation supporting means includes:

application part creation supporting means and address part creation supporting means;

said application part creation supporting means allows a draftsman of the electric form template to separately define the plurality of item fields to which the application item can be input, thereby creating the application part;

said address part creation supporting means includes:

a plurality of approval patterns which are different from each other, stored in advance in storing means and used when requesting confirmation whether to approve the application item from the approval officers;

approval pattern selecting means which reads and displays from the storing means the plurality of approval patterns and which allows the draftsman of the form template to select a specific approval pattern from the displayed approval patterns; and address part creating means which, in accordance with the approval pattern selected by the approval pattern selecting means, creates the approval officer field where the approval officers are specified and a program requesting approval for the electric form from the approval officers specified in the approval officer field via the computer network; and by the applicant, the template is invoked on a terminal of the applicant to create the electric form; the application item is input in the item fields of the application part; and the approval officers are specified in the approval officer field so that the electric form template will become the electric form: and application filing for approval of the application item is practiced via the computer network.

2. The electric form handling system of claim 1, wherein said address part creation supporting means is provided with said plurality of approval patterns in accordance with the number of departments in which approval is to be obtained by using said electric form.

3. The electric form handling system of claim 2, wherein said plurality of approval patterns of said address part creation supporting means include a serial approval pattern in which approval for an electric form is requested successively one by one of a plurality of approval officers and a parallel approval pattern in which approval for an electric form is requested simultaneously in parallel of a plurality of approval officers.

4. The electric form handling system of claim 1, wherein an address part of said form template includes an ultimate approval officer field in which an ultimate approval officer to ultimately approve said electric form is specified and one or more of advance approval officer fields in each of which an advance approval officer to approve said electric form before said ultimate approval officer is specified, and said program is set in such a manner that when no advance approval officer is specified in any of said one or more advance approval officer fields, approval for said electric form is requested of an approval officer in a subsequently specified approval officer field.

5. The electric form handling system of claim 1, wherein said address part creation supporting means inhibits from specifying a particular approval officer in each approval officer field of said form template.

6. The electric form handling system of claim 1, wherein said application part creation supporting means and said address part creation supporting means allow said form template to be constructed as a table having a plurality of rows, and each of said plurality of rows of said table is defined as a form item field of said application part or an approval officer field of said address part.

7. The electric form handling system of claim 6, wherein said application part creation supporting means is provided with two or more form item members each defined in a format applicable to each row of said application part, and said application part is completed by setting any of said form item members.

8. The electric form handling system of claim 1, wherein said application part creation supporting means constructs said application part as a table having a plurality of rows and a plurality of columns, and some of said plurality of rows or said plurality of columns are able to be combined to define one form item field.

9. The electric form handling system of claim 1, wherein said application part creation supporting means supports creation of said application part after the selection of said approval pattern.

10. An electric form handling program, used in an electric form handling system in which an applicant is allowed to write an electric form having an application part where an application item to be approved is input and an address part where one or more approval officers to approve said application item are specified and in which application filing of said electric form by said applicant and approval for said electric form by said approval officers specified by said applicant are practiced via a computer network, for template creation support for allowing a draftsman to create and store an electric form template to be invoked by said applicant by request, wherein said electric form template includes:
an application part having a plurality of item fields to which said application item can be input; and
an address part having an approval officer field which is blank and in which said approval officers can be specified, and
said electric form template becomes the electric form if the application item is input in the item fields and the approval officers are specified in the approval officer field,
said electric form handling program allows a computer to function as:
input means which accepts a request for creating the electric form template;
storing means in which a plurality of approval patterns is stored in advance, the approval patterns being different from each other and set to represent patterns of the approval officers to whom approval for the application item is requested;
approval pattern selecting means which reads and displays the plurality of approval patterns and which allows the draftsman of the electric form template to select a specific approval pattern from the displayed approval patterns;
address part creating means which, in accordance with the approval pattern selected by the approval pattern selecting means, creates the approval officer field where the approval officers are specified and a program requesting approval for the electric form from the approval officers specified in the approval officer field via the computer network;
means for creating the application part, the means allowing the draftsman of the electric form template to separately define the item fields in the application part in the electric form template;
means for creating the electric form template having the address part which is created by the address part creating means and the application part which is created by the means for creating the application part; and
template storing means for storing the created electric form template so that the applicant can invoke the template.

11. A computer-readable recording medium recording an electric form handling program, used in an electric form handling system in which an applicant is allowed to write an electric form having an application part where an application item to be approved is input and an address part where one or more approval officer to approve said application item are specified and in which application filing of said electric form by said applicant and approval for said electric form by said approval officers specified by said applicant are practiced via a computer network, for template creation support for allowing a draftsman to create and store an electric form template to be invoked by said applicant by request, wherein said electric form template includes:
an application part having a plurality of item fields to which said application item can be input; and
an address part having an approval officer field which is blank and in which said approval officers can be specified, and
said electric form template becomes the electric form if the application item is input in the item fields and the approval officers are specified in the approval officer field,
said electric form handling program allows a computer to function as:
input means which accents a request for creating the electric form template;
storing means in which a plurality of approval patterns is stored in advance, the approval patterns being different from each other and set to represent patterns of the approval officers to whom approval for the application item is requested;
approval pattern selecting means which reads and displays the plurality of approval patterns and which allows the draftsman of the electric form template to select a specific approval pattern from the displayed approval patterns;
address part creating means which, in accordance with the approval pattern selected by the approval pattern selecting means, creates the approval officer field where the approval officers are specified and a program requesting approval for the electric form from the approval officers specified in the approval officer field via the computer network;
means for creating the application part, the means allowing the draftsman of the electric form template to separately define the item fields n the application part in the electric form template;

means for creating the electric form template having the address part which is created by the address part creating means and the application part which is created by the means for creating the application part; and template storing means for storing the created electric form template so that the applicant can invoke the template.

12. An electric form handling method, used in an electric form handling system in which an applicant is allowed to write an electric form having an application part where an application item to be approved is input and an address part where one or more approval officers to approve said application item are specified and in which application filing of said electric form by said applicant and approval for said electric form by said approval officers specified by said applicant are practiced via a computer network, for creating, by using a computer, an electric form template to be invoked, wherein said electric form template includes:

an application part having a plurality of item fields to which said application item can be input; and an address part having an approval officer field which is blank and in which said approval officers can be specified, and said electric form template becomes the electric form if the application item is input in the item fields and the approval officers are specified in the approval officer field, and said electric form handling method comprises the steps of:

accepting a request for creating the electric form template;

reading and displaying from storing means a plurality of approval patterns, the approval patterns being different from each other and used when requesting confirmation whether to approve the application item from an approval officer;

allowing a draftsman of the electric form template to select a specified approval pattern from the displayed approval patterns;

creating, in accordance with the selected approval pattern, the approval officer field where the approval officers are specified and a program requesting approval for the electric form from the approval officers specified in the approval officer field via the computer network;

creating the application part by allowing the draftsman of the electric form template to separately define the item fields in the application part in the electric form template;

creating the electric form template having the address part which is created in the step of creating the address part and the application part which is created in the step of creating the application part; and storing the created electric form template so that the applicant can invoke the template.

* * * * *